United States Patent [19]

Jacobsen

[11] Patent Number: 4,642,504
[45] Date of Patent: Feb. 10, 1987

[54] ELECTRIC FIELD MACHINE

[75] Inventor: Stephen C. Jacobsen, Salt Lake City, Utah

[73] Assignee: Sarcos, Inc., Salt Lake City, Utah

[21] Appl. No.: 483,110

[22] Filed: Apr. 8, 1983

[51] Int. Cl.[4] .............................................. H02N 1/00
[52] U.S. Cl. ..................................... 310/308; 310/309
[58] Field of Search .................................. 310/308–310

[56] References Cited

U.S. PATENT DOCUMENTS

| | | | |
|---|---|---|---|
| 735,621 | 8/1903 | Thomson | 310/308 X |
| 2,519,554 | 8/1950 | Felici | 310/309 |
| 2,542,494 | 2/1951 | Felici | 310/309 |
| 3,094,653 | 6/1963 | LeMay et al. | 310/309 X |
| 3,614,481 | 10/1971 | Halliday | 310/309 |
| 3,629,624 | 12/1971 | Staudte | 310/309 X |
| 3,696,258 | 10/1972 | Anderson et al. | 310/308 |

*Primary Examiner*—Donovan F. Duggan
*Attorney, Agent, or Firm*—Thorpe, North & Western

[57] ABSTRACT

A microgeometric electric field machine includes arrays of conductors formed on or carried by a plurality of substrates. The conductors on a first group of substrates carry electrical charges, with alternate conductors being charged positively and the other conductors being charged negatively. A second group of substrates are interleaved with the first group in close proximity therewith. Also included is a voltage source for successively supplying alternate positive and negative electrical charges to the conductors of the second group of substrates. Effectively a pattern of alternate positively and negatively charged conductors is established for the second group of substrates and these patterns are caused to move, relative to the substrates, along the arrays of conductors to produce "moving" electric force fields which cause one group of substrates to move with respect to the other group. The substrates may be in the form of stacked discs with the conductors being radially positioned thereon, where one group of discs is caused to rotate with respect to another group. Alternatively, the substrates may be in the form of stacked planes with the conductors positioned in parallel thereon, where one group of planes is caused to move linearly with respect to the other group, and in a direction perpendicular to the conductors. The configuration of the substrates, positioning of the conductors, and interleaving of the substrates and conductors could take a variety of forms.

13 Claims, 7 Drawing Figures

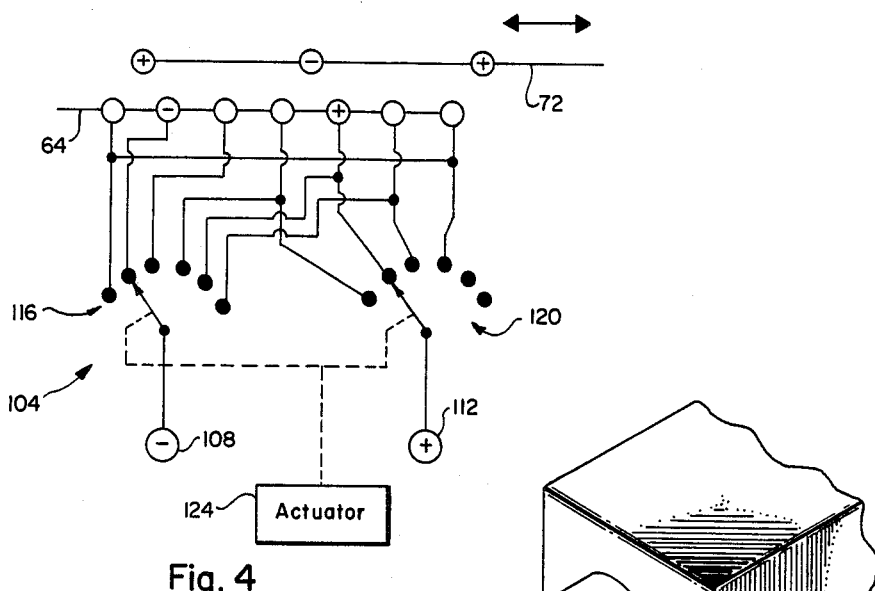
Fig. 4
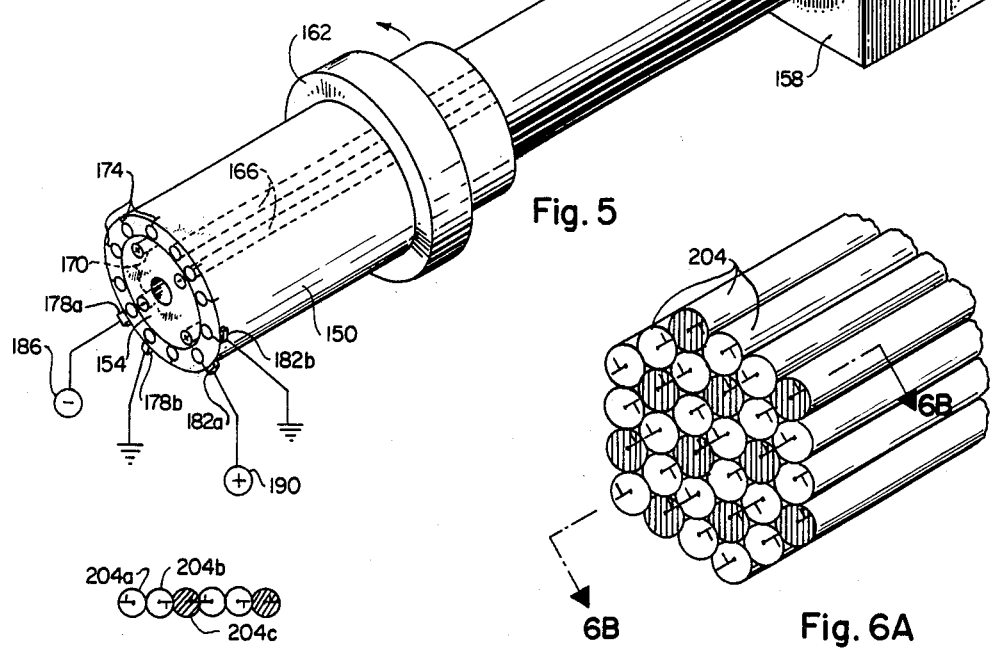
Fig. 5
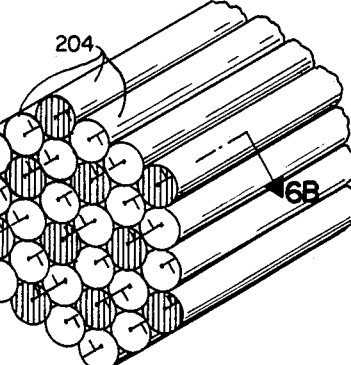
Fig. 6A
Fig. 6B

ELECTRIC FIELD MACHINE

BACKGROUND OF THE INVENTION

This invention relates to an electric field machine characterized by a multiplicity of small scale force-generating elements positioned in close proximity to one another to take advantage of the increased force of electric fields with reduced distance of separation.

Conventional electric motors typically include various combinations and arrangements of electrical conductors, magnetic field containment structures, electromagnets, permanent magnets, slip rings, commutators and other mechanical and electromechanical components. These electric motors can be AC powered, DC powered, or powered in a type of stepper operation. For certain uses, conventional electric motors exhibit various desirable characteristics such as efficient operation at design speed, controllability, noncontaminating operation, high output speed, etc. However, there exist a number of problems with conventional electric motors which limit their effectiveness in certain areas of use such as servo control and robot control.

Conventional electric motors develop relatively low field strengths and as a result the output torques are low relative to other types of actuation systems such as hydraulic and pneumatic systems. But, as already mentioned, high output speeds can be achieved and so the combination of low output torques and high speed make electric motors well suited for such things as fans, disc drives, pumps, etc.— but not for applications where high torque and low output speed are required. Of course, transmission systems can be utilized with the motors to develop a higher torque/lower speed operation, but when a transmission is added, not only is the output torque of the motor increased, a number of undesirable dynamic characteristics of the motor resulting from armature inertia and damping are also increased even more. In other words, the use of transmission systems with electric motors compromises the dynamic performance of the motors. In addition, the use of transmission systems introduces a power loss in motors with a resulting decrease in operating efficiency and increases the weight and cost of the motors.

Another disadvantage of conventional electric motors arises from the use of high mass density magnetic materials and electric conductors which gives a very poor power-to-weight ratio for the motors. This problem is most apparent when conventional electric motors are compared with hydraulic, pnematic, and combustion based power systems.

Finally, the magnitude of magnetic field forces developed in conventional electric motors is dependent upon the current carrying capabilities of the conductors which, in turn, is dependent upon the size (cross-section) of the conductors. Any attempt at reducing the scale of such magnetic-field based motors would result in a significant reduction of the forces and thus a diminishment of the utility of the motors.

SUMMARY OF THE INVENTION

It is an object of the invention to provide a new, improved and more efficient electric machine or motor.

It is also an object of the invention to provide an electric motor which utilizes the forces generated by electric fields It is a further object of the invention to provide an electric field machine or motor which can be scaled with microgeometric dimensions.

It is an additional object of the invention to provide an electric motor which generates relatively high torque at low speed.

It is another object of the invention to provide an electric motor which has a high power-to-weight ratio.

It is still another object of the invention to provide an electric motor which can be readily manufactured utilizing semiconductor technology and materials.

The above and other objects are realized in a specific illustrative embodiment of an electric field machine which includes a first plurality of elements disposed in an array and capable of being charged with an electrical charge, and a second plurality of elements also disposed in an array in close proximity to the first array and movable with respect thereto. The second plurality of elements is also capable of being charged with an electrical charge. Selected ones of the elements of the first plurality are charged positively and other elements of the first plurality, interleaved with the selected elements, are charged negatively. Also included is a voltage source for successively applying electrical charges to the elements of the second plurality with positive charges being applied to certain ones of the elements and negative charges being applied to other of the elements so that a pattern of alternate positive and negative charges is applied to the elements of the second plurality and so that the pattern is caused to move, relative to the second plurality, along the array. Application of this moving pattern of alternate positive and negative charges to the second plurality of elements results in electric force fields being produced which interact with the electric force fields produced by the alternate positively and negatively charged elements of the first plurality to thereby cause the second plurality of elements to move relative to the first plurality.

Advantageously, the elements comprise elongate conductors disposed on substrates or other bases which are formed into discs, planes, or other shapes. Alternatively, nonconductive material which contain immobilized charges may be used, e.g., electrets. Such material can be fabricated to produce the desired electric fields. Substrates carrying the static electrical charges are interleaved with substrates carrying the dynamic electric charges. The substrates advantageously contain numerous electrical conductors and substrates are dimensioned for placement in close proximity with the other substrates. Such positioning of electrical charge carrying elements results in the production of strong electric force fields and these fields interact to produce motion in certain of the elements relative to other elements.

The strong electric fields resulting from the close proximity of charge carrying elements can be understood by recognizing that for point charges the field force is inversely proportional to the distance squared ($F \approx k/r^2$), and for line charges the field force is inversely proportional to the distance ($F \approx k/r$). Although reduction of scale for electromagnetic components of motors will not provide the forces desired, for the reasons given earlier, reduction of scale for electric field producing components will allow placement of the components in close proximity to produce the desired forces. Also, with reduced scale, there is less mobility of charges and so less opportunity for the forces to be neutralized by shifting charges. Finally, reducing the scale while increasing the number of charge carrying elements tends to "bundle" the charges into smaller volumes so no part (or charge) of any element is very far from any part (or charge) of an adjacent element—thus, forces cumulate to produce a large overall force

BRIEF DESCRIPTION OF THE DRAWINGS

The above and other objects, features and advantages of the invention will become apparent from a consideration of the following detailed description presented in connection with the accompanying drawings in which:

FIG. 4 is a schematic representation of the voltage source and some of the electric field producing elements of the machine of FIG. 3;

FIG. 5 is a perspective view of still another embodiment of the invention in which arrays of electric field producing elements are disposed in cylinders arranged concentrically with respect to one another; and FIGS. 6A and 6B show, respectively, a perspective, partially cut away view and a side, partially fragmented view of an additional embodiment of the invention which utilizes helically wound rods.

DETAILED DESCRIPTION

Figure 1:
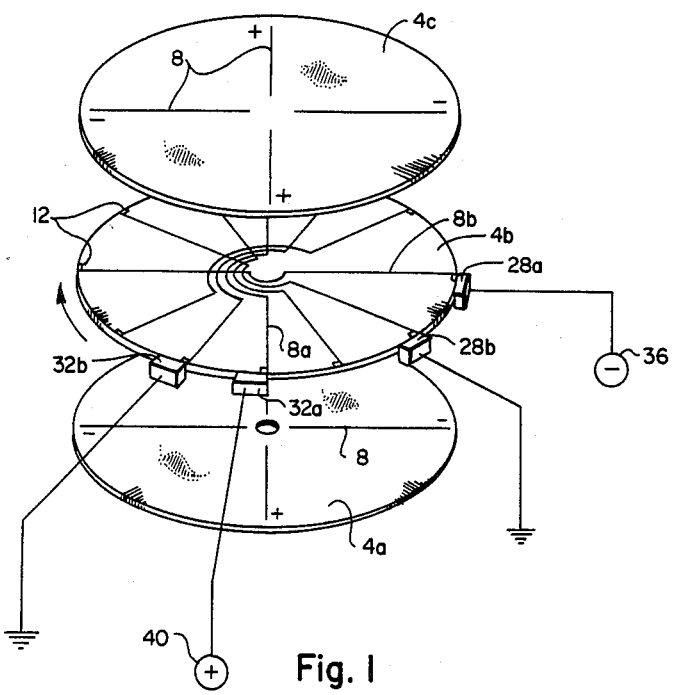
FIG. 1 is a perspective, exploded view of an electric field machine made in accordance with the principles of the present invention to include a plurality of discs carrying electric field producing conductors.
Figure 2:
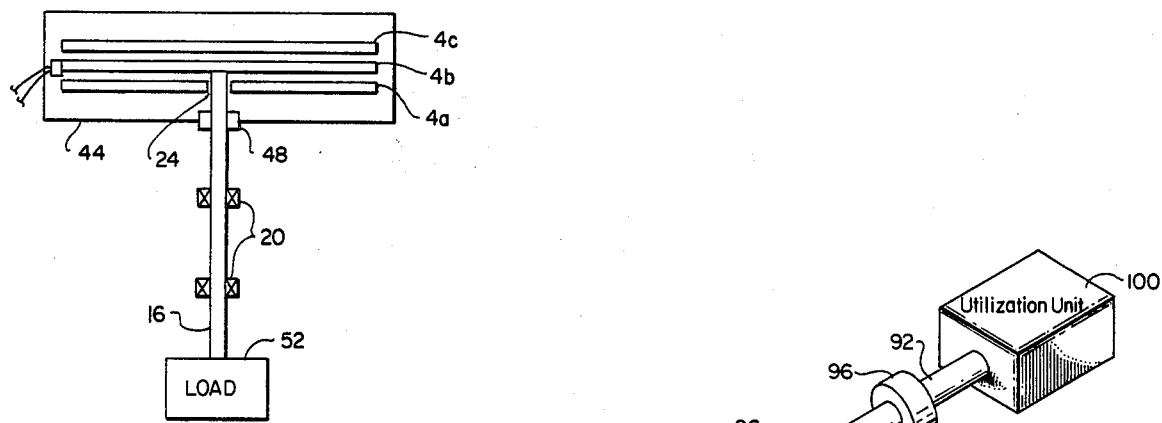
FIG. 2 is a side, cross-sectional view of the machine of FIG. 1.

Referring to FIGS. 1 and 2, there is shown one illustrative embodiment of the present invention. This embodiment includes a plurality of substrates or base members 4, formed into discs and stacked one above the other. Disposed on each substrate are a plurality of elongate, generally radially positioned conductors 8. Although only four conductors are shown on each of substrates 4A and 4C, it should be understood that there would be a much greater number than this. Alternate ones of the conductors on substrates 4A and 4C are charged positively and the remaining conductors are charged negatively. Like charged conductors of substrates 4A and 4C are aligned in the vertical direction as shown. Advantageously, the substrates would be constructed of an electrical insulative material such as silicone, and the conductors would be deposited or formed thereon using conventional semi-conductor fabrication techniques. The conductors might be copper, gold, or a variety of other metals, alloys or semiconductors. Alternatively, electrets (nonconductive material containing immobilized charges) made, for example, of polypropylene, polyethylene, etc., could be utilized in place of the conductors 8.

The center substrate 4B also carries a plurality of radially positioned conductors which extend from near the center of the substrate to the outer edge thereof. Substrate 4B contains three times the number of conductors as do substrates 4A and 4C. Contact pads 12 are disposed on the edge of the substrate 4B in contact with each of the conductors.

Substrates 4A and 4C are static whereas substrate 4B is mounted to rotate relative to the substrates 4A and 4C, as best seen in FIG. 2. In particular, substrate 4B is mounted on the end of a shaft 16 which, in turn, is rotatably mounted in bearings 20. The shaft 16 extends through an opening 24 in substrate 4A as shown. As mentioned earlier, the electric field machine of FIGS. 1 and 2 would advantageously contain many more substrates than the three shown, in which event each of the rotatable substrates would be mounted on a single shaft and each would be disposed between a different pair of static substrates in an interleaved fashion.

Disposed to contact the contact pads 12 of the substrate 4B are two pair of electrical contact brushes 28 and 32. Brush 28A is coupled to a negative voltage source 36 and brush 28B is coupled to ground. Brush 32A is coupled to a positive voltage source 40 and brush 32B is coupled to ground. Brushes 28A and 32A are positioned to simultaneously contact every third conductor contact pad on substrate 4B so that, for example, as conductor 8B (which extends diametrically on the substrate 4B) is contacted by brush 28A to receive a negative charge, conductor 8A (which also extends diametrically on the substrate 4B) is in contact with brush 32A to receive a positive charge. The two conductors positioned at this time between brushes 28A and 32A are uncharged. This is because these conductors' contact pads would have contacted brush 28B which would have discharged the conductors. Thus, every third conductor of substrate 4B is charged alternately with a positive charge and a negative charge.

In the discussion above, mention was made of "brushes" 28A, 28B, 32A and 32B which perform a commutation function in the FIG. 1 embodiment (and in other embodiments of the present invention to be described momentarily). That is, the brushes serve to change the charge on selected conductors at selected times. This function, one of sensing the location of certain conductors and controlling the charge thereon, might be carried out by a variety of other mechanisms including solid state devices which sense conductor locations and control application of charges thereto. Additionally, various charge carrying elements of an electric field machine made in accordance with the present invention could be commutated locally, for example, by solid state devices integrated with the conductors and adapted to sense the location of the conductors and control the application of charges. Hereinafter, when the use of "brushes" is discussed, it should be understood that such terminology represents commutation in general and that various other specific implementations could be utilized.

As conductor 8B becomes negatively charged, an electric force field is produced which interacts with the electric force fields produced by the aligned conductors on substrates 4A and 4C. Since these aligned conductors are also negatively charged, the resulting force field produced by conductor 8B causes the conductor to be repelled and this, in turn, causes the substrate 4B to rotate in the clockwise direction (when looking down on the stack) as indicated by the arrow. Similarly, when conductor 8A contacts brush 32A via its contact pad, it becomes positively charged and the resulting electric force field interacts with the force field of the aligned conductors of substrates 4A and 4C so that it also is repelled. As the substrate 4B rotates, the conductors just previously charged contact brushes 28B and 32B and are thus discharged.

The positioning and dimensions of the pairs of brushes 28 and 32 are selected so that for any position of the substrate 4B, at least one of its conductors is in contact with either brush 28A or brush 32A. The reason for this is so that when power is turned on, the substrate 4B will begin to rotate regardless of its position. The pairs of brushes 28 and 32 may be of conventional design to include, for example, a multiplicity of wire conductors disposed to contact the contact pads 12 as the substrate 4B is rotated. The voltage sources 36 and 40, of course, are conventional and could include switching devices to allow selective coupling and uncoupling of the voltage sources from their respective brushes.

As already discussed, there would be a far greater number of conductors than the number shown in FIG. 1. For example, for a substrate 4C having a diameter of one-eighth of an inch, illustratively sixteen conductors could be provided thereon. Then, substrate 4B, which would have substantially the same diameter, would include forty-eight conductors. Also, electrical contact brushes would be provided so that every third conductor on substrate 4B would be successively charged either positively or negatively as the substrate rotated. Generally, the width for the conductors would be about 200 to 5000 angstroms, the spacing between conductors about 200 to 5000 angstroms, and the spacing between the substrates about 200 to 5000 angstroms.

In order to reduce the chance of arcing between conductors on the different substrates, the substrates could be housed in a container 44 holding a dielectric oil such as mineral oil. In effect, the center substrate 4B would rotate in the oil which would serve both to prevent arcing and as a lubricant and preservative for the plates and conductors. To further enhance the electric force fields produced by the charged conductors, the dielectric oil might advantageously include polymeric dipoles, other dipoles or multi-poles. Exemplary dipoles could include electron impregnated nylon, polypropylene or polyester particles. The effect of including the dipoles would be to promote and enhance the interaction of electric force fields between conductors on one substrate contiguous with conductors of an adjacent substrate.

Also shown in FIG. 2 is a packing element 48 through which the shaft 16 extends out of the housing 44. The packing element 48 is provided to prevent leakage of the dielectric oil from the entry and exit location of the shaft 16 in the housing. The end of the shaft 16 opposite that on which the substrate 4B is mounted is coupled to some type of load 52.

As is evident from the description of the FIGS. 1 and 2 machine, the conductors on alternate ones of the substrates are charged in such a way that patterns of alternate positive and negative charges are caused to move relative to those substrates. In the FIGS. 1 and 2 embodiment, it is actually the substrate 4B which moves while the pattern of alternately charged conductors remain static. That is, the general locations of the positively charged conductors and negatively charged conductors of substrate 4B remain static while the substrate is caused to move. Of course, by appropriate electrical switching, patterns of alternate positive and negative charges could be made to "rotate" on a set of static substrates and thereby cause rotatable substrates containing conductors with fixed charges to rotate. This latter approach to producing the electric force fields is adopted in the embodiment of FIGS. 3 and 4.

Figure 3:
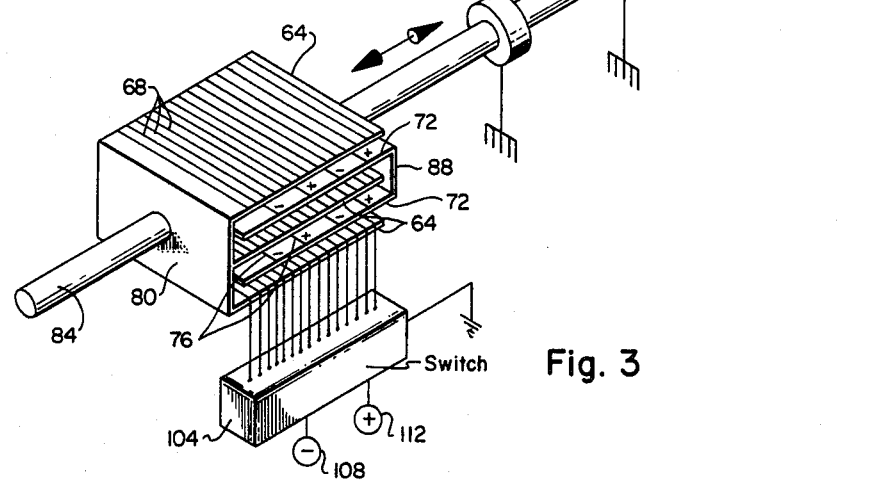
FIG. 3 is a perspective view of another embodiment of an electric field machine in which one set of electric field producing elements reciprocates linearly with respect to another set.

The embodiment of FIGS. 3 and 4 includes a stack of generally rectangular substrates 64 on which are positioned a plurality of generally elongate, parallel conductors 68. Each conductor on the topmost substrate 64 is aligned vertically with a corresponding conductor on each of the lower substrates. A second stack of generally rectangular substrates 72 is interleaved with the substrate 64 of the first stack as generally shown in FIG. 3. A plurality of conductors 76 are also formed on the substrate 72 in a generally parallel relationship both with the remaining conductors on the substrate 72 and with the conductors 68 of the substrates 64. As with the embodiment of FIGS. 1 and 2, in the embodiment of FIGS. 3 and 4, substrates 64 contain three times the number of conductors as do substrates 72.

The substrates 64 are coupled together by a plate 80 which, in turn, is fixed in place by a support rod 84. The substrates 72 are similarly held in place by a plate 88 which is mounted on a rod 92. The rod is slidably mounted in fixed bearings 96. The end of the rod 92 opposite the end on which the plate 88 is mounted is mechanically coupled to a utilization unit 100.

Each of the conductors 68 of the substrates 64 are coupled to a switching device 104 and the switching device, in turn, is coupled to a negative voltage source 108, a positive voltage source 112 and ground potential. As will be described momentarily, the switching device 104 applies alternate positive and negative charges to the conductors of substrates 64. Although FIG. 3 shows coupling of the switching device 104 only to the conductors of the bottommost substrate 64, it should be understood that each line from the switching device is coupled to a selected conductor on the bottommost substrate and to each of the vertically aligned conductors of the other substrates.

Alternate ones of the conductors 76 of the substrate 72 are charged negatively, with the remaining conductors being charged positively. Again, vertically aligned conductors of the substrate 74 contain like charges. Application of alternate patterns of positive and negative charges to the conductors 68 of the substrates 64 results in force fields being produced which causes the conductors 76 and thus the substrate 74 to move linearly. In other words, the substrates 2 may be caused to move to the right, to the left, or back and forth between the substrates 64 and this causes the rod 92 to move similarly.

FIG. 4 shows a schematic representation of the switching device 104, the bottommost substrate 64 and the next upper adjacent substrate 72. Conductors on the substrate 72 are represented by circles with either a positive or negative sign therein representing the charge contained on the conductor. Similarly, the conductors of substrate 64 are represented by circles. Switching device 104 includes two ganged rotary switches 116 and 120. The wipers of switches 116 and 120 are caused to rotate by an actuator 124 which could be a small conventional motor. The actuator 124 operates to cause the wipers to rotate first in the clockwise direction until the wipers reach the respective rightmost stationary contacts, and then counterclockwise until the wipers reach the respective leftmost stationary contacts, and then counterclockwise again, etc. As the wipers rotate clockwise, a pattern of alternate negative and positive charges on the conductors of substrate 64 is caused to move toward the right in FIG. 4 and thereby produce a moving force field which causes the substrate 72 to also move to the right. When the wipers reach the respective rightmost contacts, the direction of movement of the wipers may be reversed by the actuator 124 so that the pattern of alternate negative and positive charges is caused to move along the conductors of substrate 64 toward the left and this, in turn, would cause the substrate 72 to move to the left. In this manner, the substrate 72 may be caused to move in either direction in a linear fashion. (Grounding wipers would also be provided to ground the conductors of substrate 64 just after the conductors are charged.)

As with the embodiment of FIGS. 1 and 2, the embodiment of FIGS. 3 and 4 could include provision of a dielectric oil about the substrates 64 and 72. Again, the substrates would simply be contained in a housing which included the dielectric oil.

FIG. 5 shows still another embodiment which includes a pair of cylindrical substrates 150 and 154. with substrate 150 disposed concentrically about substrate 154. The inner cylindrical substrate 154 is fixed to a stationary support 158 and the outer cylindrical substrate 150 is rotably mounted on and carried by the inner substrate 54. A pulley 162 is mounted to the exterior of the substrate 150 to allow mechanically coupling the substrate to a load. Substrate 150 includes a plurality of elongate conductors 166 arranged in parallel around the inner periphery of the substrate. Substrate 154 similarly includes a plurality of conductors 170 arranged in parallel on the outer periphery of the substrate. Substrate 150 includes three times the number of conductors as does substrate 154. Each of the conductors on substrate 150 includes a contact element 174, each of which extends from its respective conductor to the outer periphery of the substrate 150. There, the contact elements 174 successively contact two pairs of electrical contact brushes 178 and 182, as the substrate 150 rotates. Contact brush 178A is coupled to a negative voltage source 186 and contact brush 182A is coupled to a positive voltage source 190. Contact brushes 178B and 182B are each coupled to ground.

The embodiment of FIG. 5 operates in a fashion similar to that of FIG. 1 in which a pattern of alternate positive and negative charges are produced on the conductors of substrate 150 and this pattern produces electric force fields which interact with the electric force fields produced by conductors 170 to cause the substrate 150 to rotate in the counterclockwise direction. At any given time, every third conductor 166 of the substrate 150 is charged alternately positively or negatively. (Although not specifically shown in FIG. 5, diametrically opposite conductors on substrate 150 are electrically coupled together.) After a conductor on substrate 150 is charged, it is thereafter discharged upon encountering brush 178B or brush 182B. As the substrate 50 continues to rotate, that conductor encounters either brush 178A or 182A where it receives a charge opposite to that to which it was previously charged.

Although only four conductors are shown for the substrate 54 and twelve conductors shown for substrate 150, it should be understood that many more conductors would typically be provided to enable placement of the conductors on one substrate in close proximity with those of the other substrate. The conductors shown in FIG. 5 are embedded within the corresponding substrate but near either the inner periphery of substrate 150 or the outer periphery of substrate 154. With this configuration, the substrate itself serves both to carry the conductors and also as a dielectric to prevent arcing between conductors. Some type of lubricant such as conventional machine oil could be placed between substrates 150 and 154 to reduce friction and facilitate rotation of substrate 150.

FIGS. 6A and 6B show a further embodiment of the invention to include a plurality of rods 204, about which are helically wound conductors 208. The rods 204 are arranged in a closely packed configuration consisting of one movable rod for every two stationary rods. The movable rods are shown with cross hatching in FIG. 6A and, as there indicated, each movable rod is surrounded by six nonmovable rods in a type of hexagonal configuration.

The conductor windings on the rods are schematically illustrated by symbols drawn on the tops thereof and these symbols can be understood by referring to FIG. 6B. Thus, for example, the leftmost rod 204a indicates that the conductor 208a begins on the top, left side of the rod and is wound clockwise into the page. The conductor 208b for rod 204b begins on the top, right side of the rod and is also wound clockwise into the page. 204c, which is a movable rod, is wound with a plurality of conductors which are spaced apart along the length of the rod, with each conductor being wound counterclockwise into the page. As can be seen in FIG. 6A, the conductors on each pair of adjacent nonmovable rods which are spaced about a movable rod are wound in opposite directions.

The helix angles of the conductors wound about the nonmovable rods are about twice the helix angles of the conductors wound about the movable rods, as best seen in FIG. 6B. That is, the conductors on the nonmovable rods make two revolutions for every one revolution of the conductors on the movable rods.

In operation, the conductors on each of the nonmovable rods are charged with a certain charge polarity, such as negative, and the conductors on the movable rods are charged with a "moving pattern" of charges of the opposite polarity. That is, one or more conductors on the movable rods is first charged positively and then discharged, with the next adjacent conductor or conductors then being charged positively and discharged, etc., so that a pattern of positively charged conductors is caused to move lengthwise along the movable rods. This may be accomplished, for example, by contact brushes 212 and 216 which are coupled to a switch 220 which, in turn, is coupled to a positive voltage source 224, negative voltage source 228, and a neutral or ground voltage source 232. One of the contact brushes would be supplied with a positive voltage to energize conductors in contact therewith whereas the other brush would be connected to neutral or ground potential 232 to discharge previously charged conductors. Upon supplying a positive charge to the conductors by one of the brushes, those conductors are attracted to the negatively charged conductors wound on the nonmovable rods to cause the movable rod to move linearly. As the positively charged conductors on the movable rod approach the negatively charged conductors on the nonmovable rods, the positively charged conductors would be discharged and successive adjacent conductors would be charged positively to continue the attracting process of the conductors. When the movable rods reach the farthest excursion of linear movement, the switch 220 would reverse the sequence of charging and discharging of conductors to cause the movable rods to be moved in the reverse direction.

It will be understood that rather than simply discharging the positively charged conductors on the movable rods, negative charges may be applied thereto to provide both an attraction mode and a repelling mode of operation in the FIGS. 6A and 6B assembly. That is, alternate ones of the conductors on the movable rods may be charged negatively so as to repel from the negatively charged conductors of the nonmovable rods. Such repelling force would serve to move the movable rods in the same fashion that the attraction force of the positive charged conductors do.

In the manner described, movement of the movable rods is achieved with a fairly simple and compact assembly of helically wound rods. Of course, the nonmovable rods would be joined together and held in place, for example at their ends, and the movable rods could be likewise joined together to help maintain the spaced relationship therebetween. It can be demonstrated that for hexagonal arrays, such as shown in FIG. 6A, the rods can be helically wound and charged so that the movable rods can be held in place, out of contact with the six surrounding rods simply by the forces of the electric fields. Also, some of the interior nonmovable rods could also be held in place in the same fashion. Also, as with the other embodiments, the entire assembly could be immersed in some type of dielectric oil which included polymeric dipoles or multipoles. The rods 204 would advantageously be constructed of a nonconducting material such as silicone.

Although four specific embodiments of the present invention have been shown and described, it should be understood that the shape and configuration of the substrates and charge holding elements carried thereby could take a variety of forms. The common feature of all of these embodiments is the utilization of a plurality of small scale charge carrying elements interleaved in close proximity to one another. The elements either carry a charge or are periodically charged and discharged to produce electric force fields which interact to cause movement of some of the elements relative to the others. Because of the small scale, the elements can be placed in close proximity to utilize the increased electric field forces resulting from the close proximity.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. An electric field machine comprising
   first and second pluralities of elongate elements, wherein said elongate elements are capable of being charged with an electrical charge, and each of said elongate elements has a width of between about 200 and 5000 angstroms,
   the first plurality of elongate elements being disposed in a first array,
   the second plurality of elongate elements being disposed in a second array which is spaced in close proximity of between about 200 and 5000 angstroms to the first array, with said second array being movable with respect to said first array,
   either the first or second plurality of elements being electrically charged, with certain elements being charged negatively and the other elements, interspersed among the certain elements, being changed positively, and
   means for successively applying electrical charges to the other plurality of elements to produce electric force fields which cause the second plurality of elements to move with respect to the first plurality of elements, said electrical charge applying means including means for alternately applying negative charges and positive charges to selected ones of the elements of said other plurality and for alternately applying positive charges and negative charges to the other of such elements interspersed among the selected elements.

2. An electric field machine as in claim 1 wherein said electrical charge applying means is coupled to the first plurality of elements for successively applying electrical charges thereto.

3. An electric field machine as in claim 1 wherein said electrical charge applying means comprises
   conductors coupled to the first plurality of elements,
   a positive voltage source,
   a negative voltage source, and
   switch means for periodically coupling the positive and negative voltage sources to the conductors.

4. An electric field machine as in claim 1 wherein said electrical charge applying means is coupled to the second plurality of elements for successively applying electrical charges to the elements.

5. An electric field machine as in claim 4 wherein said electrical charge applying means comprises
   contact pads coupled to the second plurality of elements and movable therewith,
   a positive voltage source,
   a negative voltage source, and
   means disposed to periodically convey charges from the voltage sources to the pads.

6. An electric field machine as in claim 1 wherein the elements of the first and second arrays comprise elongate conductors, and wherein alternate ones of the charged elements of said one plurality are charged negatively and the remaining charged elements are charged positively.

7. An electric field machine as in claim 6 wherein the first and second plurality of elements are disposed in a stacked, spaced apart relationship.

8. An electric field machine as in claim 1 wherein said second array rotates with respect to said first array.

9. An electric field machine as in claim 8 wherein said first plurality of elements are arranged in a multiplicity of planes stacked one above another in a spaced-apart relationship, and wherein said second plurality of elements are arranged in a multiplicity of planes interleaved among the planes of the first plurality, generally parallel therewith and rotatable with respect thereto, with the elements in each plane comprising elongate conductors, each extending generally radially outwardly from near the center of the respective plane.

10. An electric field machine as in claim 9 wherein for each pair of adjacent planes, alternate elements of one of the planes are charged positively with the other elements of that plane being charged negatively, and wherein said electrical charge applying means includes means for applying alternate positive and negative charges in succession to the elements of the other plane to thereby produce an electric force field between said one and said other plane to cause the other plane to rotate.

11. An electric field machine as in claim 10 wherein the spacing of elements in said one plane is two or more times the spacing of elements in said other plane, and wherein the alternate positive and negative charges applied to the array of elements in said other plane are applied to elements spaced apart substantially the same as the spacing of elements in said one plane.

12. An electric field machine as in claim 11 wherein said electrical charge applying means comprises brush means disposed to periodically contact and apply charges to elements of said other plane as the plane rotates.

13. An electric field machine as in claim 12 wherein, the spacing of elements of said other plane is from about 200 to 5000 angstroms, and wherein the spacing between planes is from about 200 to 5000 angstroms.

* * * * *